United States Patent
Maeda

(10) Patent No.: US 8,725,381 B2
(45) Date of Patent: May 13, 2014

(54) SLIP DETECTION APPARATUS AND SLIP DETECTION METHOD

(75) Inventor: Eiji Maeda, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1164 days.

(21) Appl. No.: 12/087,541

(22) PCT Filed: Jun. 29, 2007

(86) PCT No.: PCT/JP2007/063076
§ 371 (c)(1),
(2), (4) Date: Jul. 9, 2008

(87) PCT Pub. No.: WO2008/023497
PCT Pub. Date: Feb. 28, 2008

(65) Prior Publication Data
US 2009/0005947 A1    Jan. 1, 2009

(30) Foreign Application Priority Data

Aug. 25, 2006 (JP) .................... 2006-229138

(51) Int. Cl.
*B60K 31/00* (2006.01)
*B60W 20/00* (2006.01)
*B60L 3/00* (2006.01)

(52) U.S. Cl.
USPC ............. 701/82; 701/88; 701/90; 180/190

(58) Field of Classification Search
USPC .............. 180/170, 190; 701/67, 82, 88, 90
See application file for complete search history.

(56) References Cited

U.S. PATENT DOCUMENTS

| | | | |
|---|---|---|---|
| 6,241,326 B1 * | 6/2001 | Ferguson et al. | 303/177 |
| 2003/0136596 A1 * | 7/2003 | Iriyama | 180/170 |
| 2004/0133328 A1 * | 7/2004 | Bastian et al. | 701/67 |

FOREIGN PATENT DOCUMENTS

| | | |
|---|---|---|
| JP | A 9-249109 | 9/1997 |
| JP | A 10-285707 | 10/1998 |
| JP | A 11-304830 | 11/1999 |
| JP | A 2003-148192 | 5/2003 |
| JP | A 2005-47313 | 2/2005 |
| JP | A 2005-47314 | 2/2005 |
| JP | A 2005-51887 | 2/2005 |
| JP | A 2005-51889 | 2/2005 |
| JP | A 2005-344825 | 12/2005 |

* cited by examiner

*Primary Examiner* — Adam Tissot
(74) *Attorney, Agent, or Firm* — Oliff PLC

(57) ABSTRACT

The procedure of slip detection computes a right wheel speed Vr from a rotation speed Nm2 of a motor MG2 determined according to a detection result of a rotational position detection sensor 44 and from a left wheel speed Vl measured by a wheel speed sensor 64b attached to a left wheel 62b. A right wheel acceleration ar is calculated from the computed right wheel speed Vr. When the calculated right wheel acceleration ar exceeds a preset reference value arslip, the procedure detects the occurrence of a slip of a right wheel 62a. When a left wheel acceleration al calculated from the obtained left wheel speed Vl exceeds a preset reference value alslip, the procedure detects the occurrence of a slip of the left wheel 62b.

8 Claims, 3 Drawing Sheets

SLIP DETECTION APPARATUS AND SLIP DETECTION METHOD

TECHNICAL FIELD

The present invention relates to a slip detection apparatus and a slip detection method.

BACKGROUND ART

One proposed structure of a slip detection apparatus is mounted on a vehicle, which is driven with power of a driveshaft output to left and right front wheels as drive wheels. The slip detection apparatus of the proposed structure includes wheel speed sensors and a rotational position sensor detecting the rotational position of the driveshaft (see, for example, Patent Document 1). This prior art slip detection apparatus compares an angular acceleration of the driveshaft calculated from the rotational position detected by the rotational position sensor with a predetermined threshold value and detects the occurrence of a slip of the drive wheels based on the result of the comparison. The occurrence of the slip of the left and right front wheels is detected based on whether a difference between left and right wheel speeds measured by the wheel speed sensors respectively attached to the left and right front wheels exceeds a preset allowable range about an estimated difference between the left and right wheel speeds in the grip condition.
Patent Document 1: Japanese Patent Laid-Open No. 2005-47313

DISCLOSURE OF THE INVENTION

For the accurate detection of the occurrence of a slip of the drive wheels, it is desirable to use the angular acceleration of the driveshaft and the wheel speeds of the respective drive wheels like the prior art slip detection apparatus explained above. Another issue is reduction of the total number of parts for the less number of assembly operations and for the easy maintenance. The slip detection apparatus is accordingly required to have the less number of sensors and other parts, simultaneously with maintaining the high accuracy.

In the slip detection apparatus and the slip detection method, there would thus be a demand for reducing the total number of parts required for detection of the occurrence of a slip on left and right drive wheels. In the slip detection apparatus and the slip detection method, there would also be a demand for detecting the occurrence of a slip on the left and right drive wheels with high accuracy.

The present invention accomplishes at least part of the demands mentioned above and the other relevant demands by the following configurations applied to the slip detection apparatus and the slip detection method.

One aspect of the invention pertains to a slip detection apparatus configured to detect a slip of a vehicle that is driven with power output to a driveshaft. The slip detection apparatus includes: a first wheel rotation speed sensor configured to obtain a first wheel rotation speed or a rotation speed of one of left and right wheels linked with the driveshaft; a driveshaft rotation speed sensor configured to obtain a driveshaft rotation speed or a rotation speed of the driveshaft; and a slip detector configured to detect occurrence of a slip of the left and right wheels, based on the obtained first wheel rotation speed and the obtained driveshaft rotation speed.

The slip detection apparatus according to one aspect of the invention obtains the rotation speed of one of the left and right wheels linked with the driveshaft as the first wheel rotation speed and detects the occurrence of a slip of the left and right wheels, based on the obtained first wheel rotation speed and the obtained driveshaft rotation speed. That is, the method detects the occurrence of a slip based on the driveshaft rotation speed and the rotation speed of one of left and right wheels. A measurement result of an existing device generally mounted on the vehicle may be used as the driveshaft rotation speed. The detection of the occurrence of a wheel slip is then based on this substitute driveshaft rotation speed and the obtained first wheel rotation speed. This arrangement desirably reduces the total number of parts required for detection of the occurrence of a slip on the left and right drive wheels.

In one preferable embodiment of the slip detection apparatus according to the above aspect of the invention, the vehicle is equipped with a motor connected to the driveshaft. The driveshaft rotation speed sensor detects a rotational position of a rotor in the motor and computes the driveshaft rotation speed from the detected rotational position. In the slip detection apparatus of this embodiment, a high-precision sensor required for operation control of the motor is also adoptable as a sensor for the slip detection. This arrangement desirably reduces the total number of parts required for detection of the occurrence of a slip on the left and right drive wheels, while enabling detection of the occurrence of a slip with high accuracy. A resolver is a typical example of the driveshaft rotation speed sensor detecting the rotational position of the rotor in the motor.

In another preferable embodiment of the slip detection apparatus according to the above aspect of the invention, the slip detector detects occurrence of a slip of one of the left and right wheels based on the obtained first wheel rotation speed, computes a second wheel rotation speed as a rotation speed of the other of the left and right wheels from the obtained first wheel rotation speed and the obtained driveshaft rotation speed, and detects occurrence of a slip of the other of the left and right wheels based on the computed second wheel rotation speed. This arrangement desirably ensures detection of the occurrence of a slip on the left and right drive wheels with high accuracy. In this preferable embodiment, the vehicle may be equipped with a differential gear connected with the driveshaft and with the left and right wheels, and the slip detector may compute the second wheel rotation speed from the obtained first wheel rotation speed, the obtained driveshaft rotation speed, and a gear ratio of the differential gear. This arrangement desirably ensures detection of the occurrence of a slip with higher accuracy. In this preferable embodiment, furthermore, the slip detector may detect the occurrence of a slip of the left and right wheels, based on values equivalent to differential values of the obtained first wheel rotation speed and the computed second wheel rotation speed.

In the above preferable embodiment, furthermore, the vehicle may have: an internal combustion engine; an electric power-mechanical power input output assembly connected with an output shaft of the internal combustion engine and with the driveshaft and configured to input and output power from and to the output shaft and the driveshaft through input and output of electric power and mechanical power; and an accumulator configured to transmit electric power to and from the motor and the electric power-mechanical power input output assembly.

Another aspect of the invention pertains to a slip detection method for detecting a slip of a vehicle that is driven with power output to a driveshaft, comprising the step of: detecting occurrence of a slip of the left and right wheels, based on a first wheel rotation speed and a driveshaft rotation speed, where the first wheel rotation speed is a rotation speed of one of left and right wheels linked with the driveshaft and the driveshaft rotation speed is a rotation speed of the driveshaft.

The slip detection method according to one aspect of the invention detects the occurrence of a slip of the left and right wheels, based on the first wheel rotation speed, which is a rotation speed of one of left and right wheels linked with the driveshaft, and the driveshaft rotation speed, which is a rotation speed of the driveshaft. That is, the method detects the occurrence of a slip based on the driveshaft rotation speed and the rotation speed of one of left and right wheels. A measurement result of an existing device generally mounted on the vehicle may be used as the driveshaft rotation speed. The detection of the occurrence of a wheel slip is then based on this substitute driveshaft rotation speed and the obtained first wheel rotation speed. This arrangement desirably reduces the total number of parts required for detection of the occurrence of a slip on the left and right drive wheels.

In one preferable embodiment of the slip detection method according to the above aspect of the invention, the step detects occurrence of a slip of one of the left and right wheels based on the first wheel rotation speed, computes a second wheel rotation speed as a rotation speed of the other of the left and right wheels from the first wheel rotation speed and the driveshaft rotation speed, and detects occurrence of a slip of the other of the left and right wheels based on the computed second wheel rotation speed. This arrangement desirably ensures detection of the occurrence of a slip on the left and right drive wheels with high accuracy. In this preferable embodiment, the vehicle may be equipped with a differential gear connected with the driveshaft and with the left and right wheels, and the step may compute the second wheel rotation speed from the first wheel rotation speed, the driveshaft rotation speed, and a gear ratio of the differential gear. This arrangement desirably ensures detection of the occurrence of a slip with higher accuracy. In this preferable embodiment, furthermore, the step may detect the occurrence of a slip of the left and right wheels, based on values equivalent to differential values of the first wheel rotation speed and the computed second wheel rotation speed.

BEST MODES OF CARRYING OUT THE INVENTION

Figure 1:
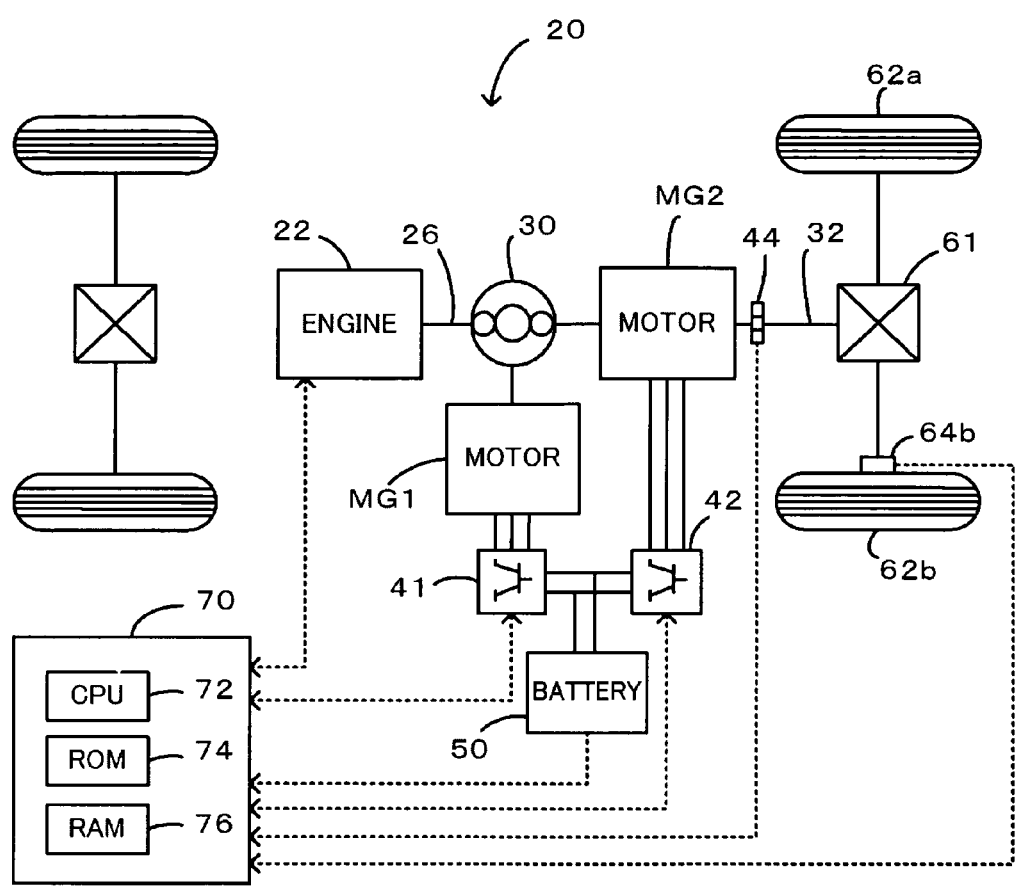
FIG. 1 schematically illustrates the configuration of a hybrid vehicle 20 in one embodiment according to the invention.

One mode of carrying out the invention is described below as a preferred embodiment. FIG. 1 schematically illustrates the configuration of a hybrid vehicle 20 equipped with a slip detection apparatus in one embodiment according to the invention. As illustrated, the hybrid vehicle 20 of the embodiment includes an engine 22, a planetary gear mechanism 30 configured to have a carrier connected to a crankshaft 26 or an output shaft of the engine 22, a motor MG1 connected to a sun gear of the planetary gear mechanism 30, a motor MG2 connected to a ring gear of the planetary gear mechanism 30 and to a driveshaft 32 linked with an axle of the hybrid vehicle 20 via a differential gear 61, a rotational position detection sensor 44 configured to detect the rotational position of a rotor in the motor MG2, a wheel speed sensor 64b attached to a left wheel 62b as one of drive wheels linked with the axle, and a main electronic control unit 70. The main electronic control unit 70 works as both a controller of the whole hybrid vehicle 20 and a controller of the slip detection apparatus. The slip detection apparatus of the embodiment is constructed by the combination of the rotational position detection sensor 44, the wheel speed sensor 64b, and the main electronic control unit 70.

The motors MG1 and MG2 are constructed as known synchronous motor generators and transmit electric power to and from a battery 50 via inverters 41 and 42. The rotational position detection sensor 44 is a resolver configured to detect the positions of magnetic poles of permanent magnets mounted on the rotor of the motor MG2 with high precision. The wheel speed sensor 64b is an electromagnetic pickup-type rotation speed sensor of a relatively simple structure.

The main electronic control unit 70 is constructed as a microprocessor including a CPU 72, a ROM 74, a RAM 76, and input and output ports (not shown). The main electronic control unit 70 receives, via its input port, a rotational position θm2 from the rotational position detection sensor 44, a left wheel speed Vl from the wheel speed sensor 64b, signals from various sensors used to monitor the operating conditions of the engine 22, signals representing phase currents from current sensors attached to power lines from the inverters 41 and 42 to the motors MG1 and MG2, signals from various sensors required for management and control of the state of the battery 50, and a vehicle speed V from a vehicle speed sensor (not shown). The main electronic control unit 70 outputs, via its output port, control signals for operation control of the engine 22 and switching control signals for switching control of the inverters 41 and 42.

Figure 2:
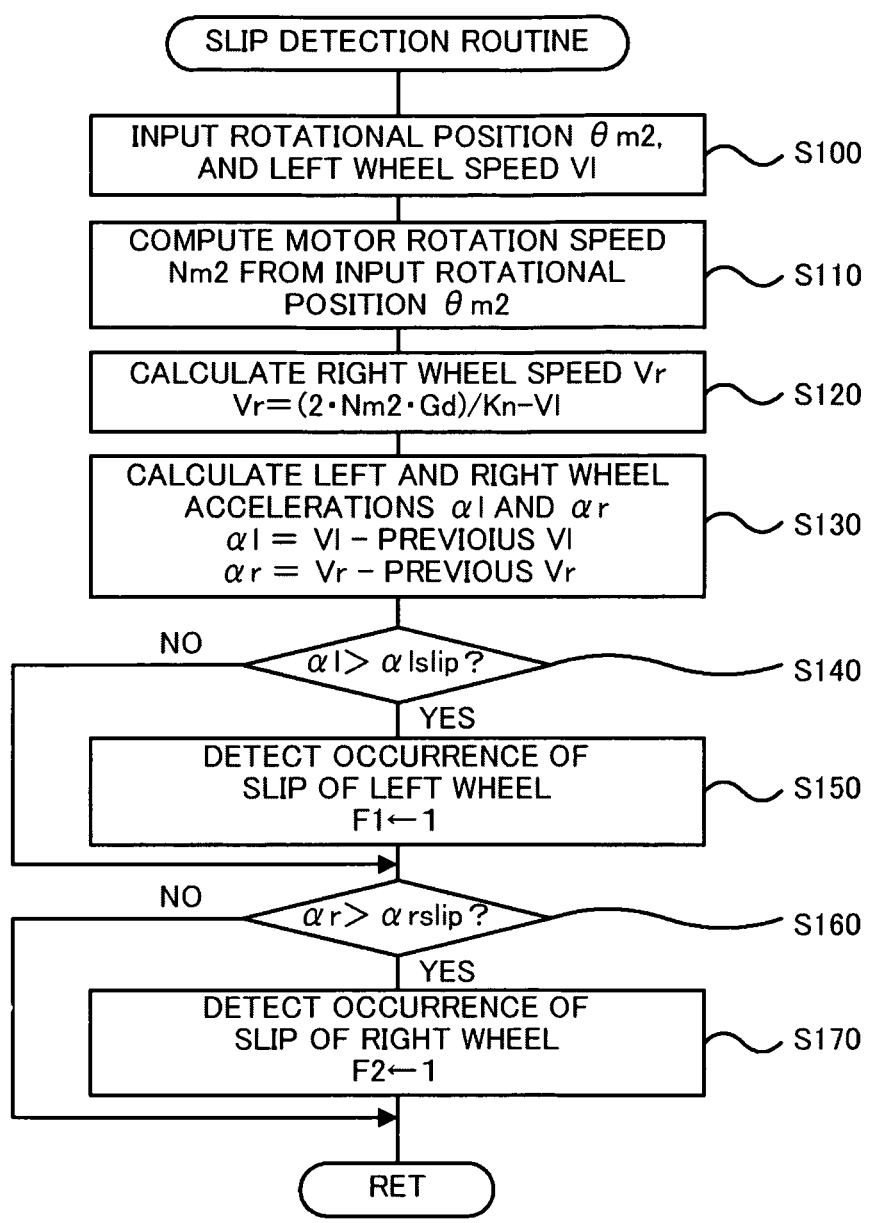
FIG. 2 is a flowchart showing a slip detection routine executed by the main electronic control unit 70.

Next, the description regards a series of processing to detect a wheel slip by the slip detection apparatus mounted on the hybrid vehicle 20 of the embodiment having the configuration described above. FIG. 2 is a flowchart showing a slip detection routine executed by the main electronic control unit 70. This slip detection routine is repeatedly performed at preset time intervals, for example, at every several msec.

In the slip detection routine, the CPU 72 of the main electronic control unit 70 first inputs various data required for slip detection, for example, the rotational position θm2 of the rotor in the motor MG2 from the rotational position detection sensor 44 and the left wheel speed Vl from the wheel speed sensor 64b (step S100). The CPU 72 computes a rotation speed Nm2 of the motor MG2 from the input rotational position θm2 (step S110) and calculates a right wheel speed Vr of a right wheel 62a from the computed rotation speed Nm2 of the motor MG2, a gear ratio Gd of the differential gear 61, the input left wheel speed Vl, and a conversion coefficient Kn according to Equation (1) given below (step S120):

$$Nm2 \cdot Gd = (Vl + Vr)/2 \times Kn \qquad (1)$$

Here the conversion coefficient Kn is used to convert the left and right wheel speeds Vl and Vr into a rotation speed of the axle.

Left and right wheel accelerations αl and αr are subsequently obtained by subtracting the previous settings of the left and right wheel speeds Vl and Vr input and calculated in a previous cycle of this slip detection routine from the current settings of the left and right wheel speeds Vl and Vr input and calculated in a current cycle of this slip detection routine (step S130). It is then determined whether the calculated left and right wheel accelerations αl and αr are respectively greater than preset reference values αlslip and αrslip (steps S140 and S160). When the left and right wheel accelerations αl and αr respectively exceed the preset reference values αlslip and αrslip, the occurrence of a slip of the left wheel 62*b* and the right wheel 62*a* is estimated. The CPU 72 then sets both a left slip flag F1 and a right slip flag F2 to 1 (steps S150 and S170) and terminates the slip detection routine. The reference values αlslip and αrslip are experimentally or otherwise specified in advance as the criterion for estimating the occurrence of a slip of the left wheel 62*b* and the right wheel 62*a* and are stored in the ROM 74. The left and right slip flags F1 and F2 represent the occurrence and non-occurrence of a slip of the left wheel 62*b* and the right wheel 62*a*. The left and right slip flags F1 and F2 are kept or reset to 0 as an initial value, which represents no occurrence of a slip of the left wheel 62*b* and the right wheel 62*a* when the left and right wheel accelerations αl and αr are not greater than the respective reference values alslip and arslip at steps S140 and S160.

The slip detection apparatus of the embodiment described above detects the occurrence of a slip of the left drive wheel and the right drive wheel, based on the rotation speed Nm2 of the motor MG2 and the left wheel speed Vl. The rotational position detection sensor 44 required for the operation control of the motor MG2 is also adoptable as a sensor for the slip detection. This arrangement desirably reduces the total number of parts required for detection of the occurrence of a slip of the left and right wheels. The rotational position detection sensor 44 has a high precision and accordingly enables highly accurate detection of the occurrence of a slip of the left and right drive wheels.

The slip detection apparatus of the embodiment detects the occurrence of a slip of the left and right wheels, based on the left and right wheel accelerations αl and αr calculated from the left and right wheel speeds Vl and Vr. This method is, however, not essential but may be modified in various ways to detect the occurrence of a slip of the left and right wheels based on the left and right wheel speeds Vl and Vr. For example, the slip detection may be performed without calculating the left and right wheel accelerations αl and αr. The occurrence of a slip of the left and right wheels may be detected, based on the result of comparison between the left and right wheel speeds Vl and Vr and the vehicle speed V input from the vehicle speed sensor (not shown).

In the slip detection apparatus of the embodiment, the motor MG2 is directly connected to the drive shaft 32. In one modification, the motor MG2 may be connected to the driveshaft 32 via a reduction gear. In this modified structure, the right wheel speed Vr may be calculated by substituting the result of a division Nm2/Gr of the rotation speed Nm2 of the motor MG2 by a gear ratio Gr of the reduction gear into the rotation speed Nm2 in Equation (1) given above.

Figure 3:
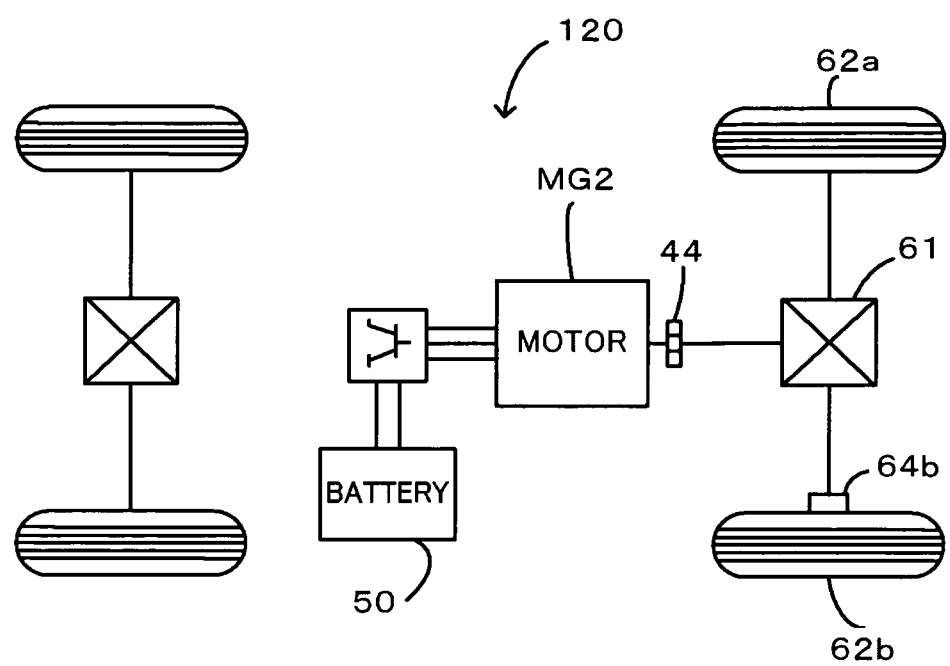
FIG. 3 schematically illustrates the configuration of a hybrid vehicle 120 in one modified structure.

The above embodiment regards one application of the invention to the hybrid vehicle 20 equipped with the engine 22 and the motor MG2 as the power sources for outputting power to the driveshaft 32 linked with the axle. The technique of the invention is not restricted to the hybrid vehicle of this configuration but is applicable to a vehicle of any other configuration driven with the power output to the driveshaft. One application is an electric vehicle 120 driven with the output power of the motor MG2 as shown in FIG. 3. The hybrid vehicle 20 of the embodiment is equipped with the motor MG2 as the power source for outputting power to the driveshaft 32 and with the rotational position detection sensor 44 for detecting the rotational position θm2 of the rotor in the motor MG2. In one application of the invention to a vehicle equipped with no motor as the power source, the rotational position detection sensor for the motor may be replaced by a rotation speed sensor for measuring the rotation speed of an output shaft of a transmission linked with an engine as the power source.

The embodiment regards the application of the invention to the hybrid vehicle 20. This is, however, not restrictive, but the technique of the invention is applicable to diversity of vehicles, for example, various automobiles as well as trains. Another aspect of the invention is a slip detection method of detecting the occurrence of a wheel slip in diversity of vehicles including automobiles and trains.

The embodiment discussed above is to be considered in all aspects as illustrative and not restrictive. There may be many modifications, changes, and alterations without departing from the scope or spirit of the main characteristics of the present invention.

Industrial Applicability

The technique of the invention is preferably applicable to the manufacturing industries of various vehicles.

The invention claimed is:

1. A slip detection apparatus configured to detect a slip of a vehicle that is driven with power output to a driveshaft, the slip detection apparatus comprising:
    a first wheel rotation speed sensor configured to obtain a first wheel rotation speed or a rotation speed of one of left and right wheels linked with the driveshaft;
    a driveshaft rotation speed sensor configured to obtain a driveshaft rotation speed or a rotation speed of the driveshaft; and
    a slip detector configured to detect occurrence of a slip of one of the left and right wheels based on the obtained first wheel rotation speed, compute a second wheel rotation speed as a rotation speed of the other of the left and right wheels by subtracting the obtained first wheel rotation speed from a product of the obtained driveshaft rotation speed and a preset coefficient, and detect occurrence of a slip of the other of the left and right wheels based on the computed second wheel rotation speed,
    wherein the first wheel rotation speed sensor is the only wheel rotation speed sensor connected to either one of the left and right wheels; and
    wherein the slip detector detects the slip by:
        calculating a first wheel acceleration by comparing a previously obtained first wheel rotation speed to the obtained first wheel rotation speed,
        calculating a second wheel acceleration by comparing a previously calculated second wheel rotation speed to the second wheel rotation speed,
        comparing each of the first wheel acceleration and the second wheel acceleration to a preset first wheel acceleration and a preset second wheel acceleration, and
        determining that the slip has occurred when either the first wheel acceleration exceeds the preset first wheel acceleration or the second wheel acceleration exceeds the preset second wheel acceleration.

2. The slip detection apparatus in accordance with claim 1, wherein the vehicle is equipped with a motor connected to the driveshaft, and
    the driveshaft rotation speed sensor detects a rotational position of a rotor in the motor and computes the driveshaft rotation speed from the detected rotational position.

3. The slip detection apparatus in accordance with claim 1, wherein the vehicle is equipped with a differential gear connected with the driveshaft and with the left and right wheels, and the slip detector computes the second wheel rotation speed based on the preset coefficient determined from a gear ratio of the differential gear.

4. The slip detection apparatus in accordance with claim 1, wherein the slip detector detects the occurrence of a slip of the left and right wheels, based on values equivalent to differential values of the obtained first wheel rotation speed and the computed second wheel rotation speed.

5. The slip detection apparatus in accordance with claim 1, wherein the vehicle has: an internal combustion engine; an electric power-mechanical power input output assembly connected with an output shaft of the internal combustion engine and with the driveshaft and configured to input and output power from and to the output shaft and the driveshaft through input and output of electric power and mechanical power; and an accumulator configured to transmit electric power to and from the motor and the electric power-mechanical power input output assembly.

6. A slip detection method for detecting a slip of a vehicle that is driven with power output to a driveshaft, the slip detection method comprising the step of:
  detecting occurrence of a slip of one of the left and right wheels based on a first wheel rotation speed,
  computing a second wheel rotation speed as a rotation speed of the other of the left and right wheels by subtracting the first wheel rotation speed from a product of the driveshaft rotation speed and a preset coefficient,
  detecting occurrence of a slip of the other of the left and right wheels based on the computed second wheel rotation speed,
  calculating a first wheel acceleration by comparing a previously obtained first wheel rotation speed to the first wheel rotation speed,
  calculating a second wheel acceleration by comparing a previously calculated second wheel rotation speed to the second wheel rotation speed,
  comparing each of the first wheel acceleration and the second wheel acceleration to a preset first wheel acceleration and a preset second wheel acceleration, and
  determining that the slip has occurred when either the first wheel acceleration exceeds the preset first wheel acceleration or the second wheel acceleration exceeds the preset second wheel acceleration,
  wherein the vehicle includes only one wheel speed sensor connected to either one of the left and right wheels.

7. The slip detection method in accordance with claim 6, wherein the vehicle is equipped with a differential gear connected with the driveshaft and with the left and right wheels, and
  said step computes the second wheel rotation speed based on the preset coefficient determined from a gear ratio of the differential gear.

8. The slip detection method in accordance with claim 6, wherein said step detects the occurrence of a slip of the left and right wheels, based on values equivalent to differential values of the first wheel rotation speed and the computed second wheel rotation speed.

\* \* \* \* \*